United States Patent

[11] 3,624,181

[72] Inventors Hideaki Munakata;
Kazoo Watanabe; Yoshikazu Arimatsu;
Masakazu Tanaka, all of Otsu-shi, Japan
[21] Appl. No. 885,964
[22] Filed Dec. 17, 1969
[45] Patented Nov. 30, 1971
[73] Assignee Toyo Boseki Kabushi Kaisha
Osaka-shi, Osaka-fu, Japan
[32] Priority Dec. 23, 1968
[33] Japan
[31] 43/94680

[54] PROCESS FOR PREPARING POLYESTERS IMPROVED IN DYEABILITY
2 Claims, No Drawings
[52] U.S. Cl. .................................................. 260/860, 260/75 N
[51] Int. Cl. .................................................. C08g 17/06, C08g 17/08, C08g 39/04
[50] Field of Search ..................................... 260/75 N, 860

[56] References Cited
UNITED STATES PATENTS
2,739,958  3/1956  Lincoln et al. ................. 260/75
3,065,207  11/1962  Andres .......................... 260/75
2,759,946  8/1956  Cislak et al. .................. 260/297

Primary Examiner—Melvin Goldstein
Attorney—Wenderoth, Lind & Ponack

ABSTRACT: Process for preparing polyesters improved in dyeability with acid dyes which comprises polycondensing a dicarboxylic acid with a glycol, the whole or part of the glycol being the one represented by the formula:

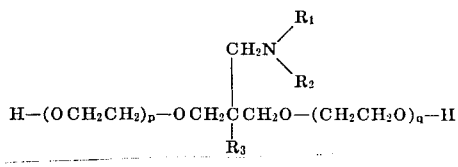

wherein $R_1$ and $R_2$ are each a lower alkyl group or, when taken together, they represent a lower alkylene group, $R_3$ is a lower alkyl group or a group of the formula:

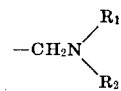

in which $R_1$ and $R_2$ are each as defined above and $p$ and $q$ are each zero or a positive integer not more than 10, or blending the resultant polymer into linear fiber-forming polyesters.

3,624,181

PROCESS FOR PREPARING POLYESTERS IMPROVED IN DYEABILITY

The present invention relates to a process for preparing polyesters improved in dyeability with acid dyes. It also relates to a process for preparing polyesters bearing a tertiary amino group.

Aromatic linear polyesters such as polyethylene terephthalate have broadly been used as fibers and films owing to their excellent physicochemical properties. But, those polyesters are difficulty dyeable, particularly with acid dyes. In order to improve such difficult dyeability, there has been proposed the introduction of a tertiary amino group to be served as the dye-site into them. Thus, the polycondensation of a dicarboxylic acid with a glycol, the whole or part of the dicarboxylic acid or the glycol being the one bearing a tertiary amino group, or the blending of the resulting polymer into polyesters affords easily dyeable polyesters. However, most of tertiary amino group-bearing compounds are not sufficiently stable to heat, especially in the presence of polyesters, and make occasionally colored the resultant polyesters.

It has now been found that tertiary amino group-containing glycols of the formula:

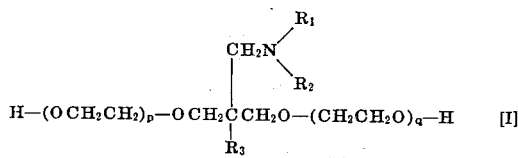

wherein $R_1$ and $R_2$ are each a lower alkyl group (e.g., methyl, ethyl propyl isopropyl, butyl) or, when taken together, they represent a lower alkylene group (e.g., tetramethylene, pentamethylene), $R_3$ is a lower alkyl group (e.g., methyl, ethyl, propyl, isopropyl butyl) or a group of the formula:

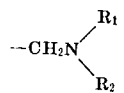

in which $R_1$ and $R_2$ are each as defined above and $p$ and $q$ are each zero or a positive integer not more than 10 are per se quite stable to heat and very hardly decomposed on the melt-extrusion of polyesters incorporated therewith as the glycol component. Thus, the introduction of the said glycols into polyesters provides polymers, of which the shaped products are materially not colored and have excellent affinity to acid dyes. The present invention is based on this finding.

A basic object of the present invention is to embody linear polyesters improved in dyeability with acid dyes. Another object of this invention is to embody polymers useful as modifiers for improving the affinity to acid dyes of polyesters. A further object of the invention is to embody a process for preparing linear polyesters having a good affinity to acid dyes. These and other objects will be apparent to those conversant with the art to which the present invention pertains from the subsequent description.

The glycol [I] used as the source material for introduction of a tertiary amino group in the present invention may be prepared by various methods, of which typical ones are shown in the following scheme:

Preparation of the glycol [I: $p=q=0$; $R_3$=lower alkyl]:

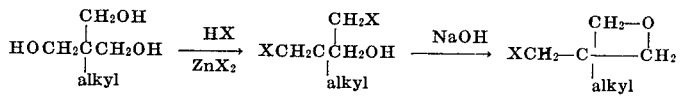

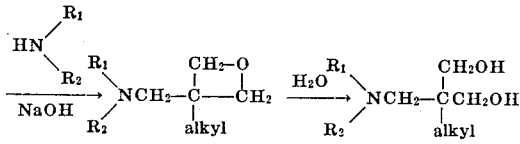

Preparation of the glycol [I: $p=q=0$; $R_3=-CH_2N\diagdown{R_1 \atop R_2}$]:

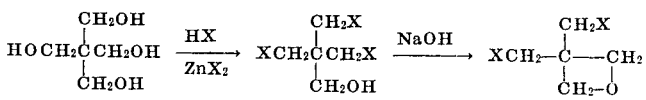

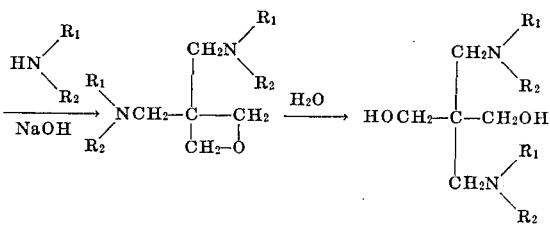

Preparation of the glycol [I: $p$ or $q \neq 0$]:

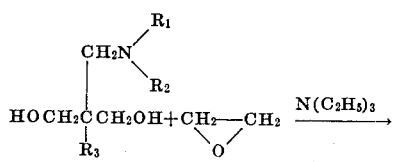

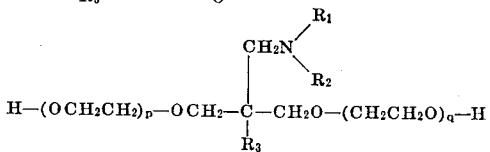

wherein X is a halogen atom (e.g., chlorine, bromine) and $R_1$, $R_2$, $R_3$, $p$ and $q$ are each as defined above.

According to the present invention, the polyesters improved in the affinity to acid dyes can be obtained by either one of the following two processes:

A. Copolymerization process

In the production of polyesters from dicarboxylic acids or their lower alkyl esters and glycols by conventional procedures such as ester exchange process and direct esterification process, the glycol [I] is used as the whole or part of the glycol component so that the polyesters having the residue of the glycol [I] in the middle of or at the terminal of the molecule chain are produced. Although it is difficult to copolymerize the glycol [I] in a large ratio since its reactivity is considerably lower than that of ethylene glycol or other alkylene glycols, the obtained polyesters are dyeable in pale or mediate colors with acid dyes.

B. Blending process

The incorporation of the polyesters (hereinafter referred to as "polymer(s) M") produced by the use of the glycol [I] as the whole or main part of the glycol component into base polyesters prepared by ordinary procedures in the melt state induces gradually the redistribution and finally affords copolyesters which are not so different in structure from the polyesters obtained in the said copolymerization process. The extent of redistribution is controllable by the time during which the melt state is maintained. Compared with the copolymerization process, the blending process is highly advantageous in the secured introduction of a desired amount of the glycol [I], i.e., the tertiary amino group as the dye-site, into polyesters. In this connection, it may be noted that the solubilities of the polymers M and the base polyesters for each other are excellent and no anxiety of separation of the blended polyesters into each component is present. The copolymerization using the glycol [I] as the whole or main part of the glycol component takes a relatively long time for completion but can ultimately yield the polymer M wherein all or most of the employed glycol [I] is incorporated as the glycol unit. For instance, the reaction of the glycol [I]dimethyl I] (DMT) affords the polyester according to the following formulae:

C. in 2 to 3 hours. The polymerization reaction is normally effected at 200° to 270° within several hours.

In an alternative way, the polymer M may be produced by direct esterification of the glycol [I] with the dicarboxylic acid. In this case, the reaction is usually carried out by heating a mixture of the glycol [I] and the dicarboxylic acid, the former being employed in an equal amount to the latter or in slightly excess, at a temperature from 170° to 260° C. in an inert atmosphere (e.g., nitrogen) while elimination of the byproduced water from the reaction system. After the production of water ceases, the atmosphere is reduced, and the polymerization is effected in the presence of the polymerization catalyst.

In another alternative way, the polymer M may be produced by reacting the glycol [I] with the dicarboxylic acid halide, preferably acid chloride. The reaction is ordinarily executed by mixing well a solution of the glycol [I] in aqueous alkali hydroxide with a solution of the dicarboxylic acid halide in an organic solvent (e.g., n-hexane, cyclohexane, benzene, toluene). In this case, the polymer is washed with water under reflux in order to remove a trace of halogen compound included therein.

Decomposition or elimination of the tertiary amino group does not occur even in the ester exchange process or the direct esterification process in which the polymerization is effected in the melt state at a higher temperature, and the obtained polymer M is scarcely colored. Particularly in case of the process with the dicarboxylic acid halide, there is obtained the polymer M excellent in whiteness.

The thus produced polymer M is materially a polyester. When, however, the ester exchange process is applied for its production, the ester exchange rate of the glycol [I] is late and, therefore, the ether bond formed as the result of side reaction is partly present, usually at the rate of about one bond per 10 ester bonds, in the product. In case of the direct esterification process, the product has extremely few ether bonds. In case of the process with the dicarboxylic acid halide, no ether bond is included. The ultimate molecular weight of the polymer M is 5,000 to 6,000 in the ester exchange process, 3,000 and 8,000 respectively in direct esterification process in

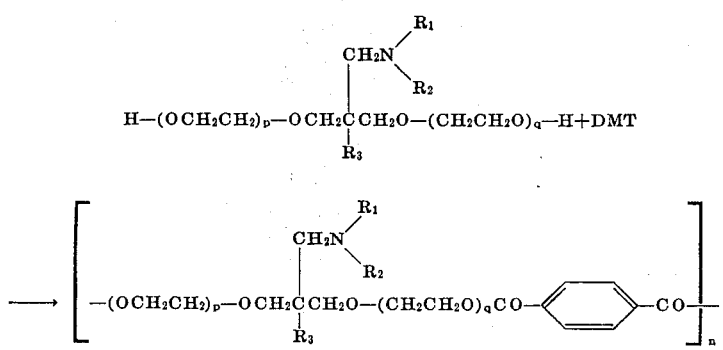

In view of the preference of the blending process, it will be hereinafter illustrated more in detail.

Production of polymers M:

THe polymer M is produced, for instance, by heating a dicarboxylic acid in the form of lower alkyl ester with the glycol [I] in the presence of an ester exchange catalyst (e.g., zinc acetate), and, after removal of the byproduced lower alkyl alcohol, heating the resultant dicarboxylic acid ester of the glycol [I] in the presence of a polymerization catalyst (e.g., germanium dioxide) under reduced pressure. Examples of the dicarboxylic acid are aliphatic dicarboxylic acids (e.g., adipic acid, sebacic acid), aromatic dicarboxylic acids e.g., terephthalic acid, isophthalic acid, naphthalenedicarboxylic acid) and their mixtures. Of these, the most suitable are terephthalic acid and isophthalic acid. The glycol [I] is normally employed in a two or three time molar amount to the dicarboxylic acid in its lower alkyl ester form. The reaction for ester exchange is in most cases accomplished at 160° to 220° the absence and presence of a catalyst, and about 9,000 in the process with the dicarboxylic acid halide.

Blending procedures:

As the base polyester, there may be used polyethylene terephthalate or copolymerized polyesters wherein the ethylene terephthalate unit is present not less than 80 mol%. Examples of the monomers to be copolymerized with ethylene terephthalate are isophthalic acid, p-hydroxybenzoic acid, polyalkylene oxide, etc. In general, the use of the copolymerized polyesters as the base polyester is preferred, because they realize the better improvement in dyeability in the identical mixing ratio.

For blending the polymer M into the base polyester such as polyethylene terephthalate, there may be adopted various procedures, of which typical ones are as follows:

1. The fully dried pellets or powder of the polymer M are admixed with the pellets or powder of the base polyester, and the mixture is melted and extruded by an extruder to shape films or filaments.

2. The fully dried polymer M is blended with the base polyester in the melt state and formed in pellets. The resultant pellets are dried, melted and extruded to obtain shaped products. In alternative, the blended polymer in the melt state may be as such extruded without the said intermediary formation in pellets.

3. The polymer M is incorporated into the polymerization mixture at the terminal period of polymerization for the base polyester and blended in the melt state, Then, the resultant blended polymer is formed in pellets or directly shaped.

Common to these procedures, the blending proportion of the polymer M and the base polyester can be appropriately decided, and the use of the polymer M in such an amount that 50 to 300 millimol of the tertiary amino group are present in 1 kg. of the blended polymer is favored for improvement of the dyeability of the base polyester without losing its physical characteristics.

In any of the above processes, the treatment of the shaped products with such acid chlorides as hydrogen chloride, phosphorus oxychloride, acetyl chloride, benzoyl, chloride will result in more excellent improvement of the dyeability.

The tertiary amino group originating in the glycol [I] is extremely stable and hardy affected in the course of polymerization, blending and shaping. Thus, the polymer, the blended polymer or the shaped product from the polymers shows practically negligible coloration without using any coloring inhibitor. When desired, however, coloring inhibitors as well as any other additives such as delustering agents, stabilizers and ultraviolet absorbers may be incorporated into the polyesters under blending or shaping.

As illustrated above, the polymer M is useful as a blend material into various kinds of linear polyesters. In addition, it can be used as a blend material into polymers other than linear polyesters, an adhesive, a coating material and so on.

Practical and presently preferred embodiments of the present invention are shown in the following examples. In these examples, parts are by weight. The reduced viscosity ($\eta$sp/C) are determined at 30° C. in C=0.4 g./dl. using a mixture of phenol and tetrachloroethane (6:4) as the solvent.

EXAMPLE 1

In a reactor, dimethyl terephthalate (1 mol), the glycol of the formula:

$$HOCH_2\underset{\underset{CH_3}{|}}{\overset{\overset{CH_2N\langle\bigcirc\rangle}{|}}{C}}CH_2OH$$

(2.5 mol) and zinc acetate (0.1 percent for the amount of dimethyl terephthalate) are charged, and the resultant mixture is heated at 197.5° C. for 60 minutes while removal of the produced methanol and then at 218° C. for 60 minutes. After heating up to 255° C. the pressure is reduced gradually to 0.03 mm. Hg in about 30 minutes. Heating is continued for 3 hours, during which excess of the glycol is distilled off to give pale yellow polymer (hereinafter referred to as "polymer A". Softening point, 99° to 110° C. $\eta$sp/C=0.085.

EXAMPLE 2

In a reactor, dimethyl terephthalate (1 mol), the glycol of the formula:

$$HOCH_2\underset{\underset{CH_3}{|}}{\overset{\overset{CH_2N(C_2H_5)_2}{|}}{C}}CH_2OH$$

(2.5 mol) and zinc acetate (0.1 percent for the amount of dimethyl terephthalate) are charged, and the resultant mixture is heated at 197.5° C. for 60 minutes while removal of the produced methanol and then at 218° C. for 60 minutes. After heating up to 255° C. the pressure is reduced gradually to 0.03 mm. Hg in about 30 minutes. Heating is continued for 3 hours, during which excess of the glycol is distilled off to give yellow polymer (hereinafter referred to as "polymer B"). Softening point, 76° to 85° C. $\eta$sp/C=0.082.

EXAMPLE 3

In a reactor, dimethyl terephthalate (1 mol), the glycol of the formula:

$$HOCH_2\underset{\underset{CH_3}{|}}{\overset{\overset{CH_2N(C_3H_7)_2}{|}}{C}}CH_2OH$$

(2.5 mol) and zinc acetate (0.1 percent of the amount of dimethyl terephthalate) are charged, and the resultant mixture is heated at 197.5° C. for 60 minutes while removal of the produced methanol and then at 218° C. for 120 minutes. After heating up to 255° C. the pressure is reduced gradually to 0.03 mm. Hg in about 45 minutes. Heating is continued for 5 hours, during which excess of the glycol is distilled off to give pale yellow polymer (hereinafter referred to as "polymer C"). Softening point, 52° to 61° C. $\eta$sp/C=0.81.

EXAMPLE 4

In a reactor, dimethyl terephthalate (1 mol), the glycol of the formula:

$$HOCH_2\underset{\underset{C_2H_5}{|}}{\overset{\overset{CH_2N(C_4H_9)_2}{|}}{C}}CH_2OH$$

(2.5 mol) and zinc acetate (0.1 percent for the amount of dimethyl terephthalate) are charged, and the reaction mixture is heated at 197.5° C. for 60 minutes while removal of the produced methanol and then at 218° C. for 120 minutes. The pressure is reduced gradually to 0.03 mm. Hg in about 30 minutes while keeping the temperature at 218° C. The reaction mixture is further heated at 255° C. for 8 hours to give pale yellow polymer (hereinafter referred to as "Polymer D"). Softening point about 30° C. $\eta$sp/C=0.081.

EXAMPLE 5

In a reactor, terephthalic acid (83 parts) and the glycol of the formula:

$$HOCH_2\underset{\underset{CH_3}{|}}{\overset{\overset{CH_2N(C_2H_5)_2}{|}}{C}}CH_2OH$$

(110 parts) are charged, and the resultant mixture is heated at 210° C. for 2 hours, during which the produced water is distilled out. After the temperature is raised to 230° C. while reducing the pressure gradually to 0.1 mm. Hg, polycondensation is carried out for 1 hour to give pale yellow polymer (hereinafter referred to as "polymer E"). Softening point, 80° to 90° C. $\eta$sp/C=0.08.

EXAMPLE 6

As in example 5, terephthalic acid (83 parts) and the glycol of the formula:

$$HOCH_2\underset{\underset{CH_3}{|}}{\overset{\overset{CH_2N(C_3H_7)_2}{|}}{C}}CH_2OH$$

(127 parts) are reacted to give pale yellow polymer (hereinafter referred to as "polymer F"). Softening point, 55° to 62° C. $\eta$sp/c=0.08.

EXAMPLE 7

A solution of the glycol of the formula:

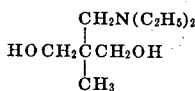

(43.6 parts) and sodium hydroxide (200 parts) in water (2,000 parts) is mixed with a solution of terephthaloyl dichloride (50.8 parts) in benzene (100 parts) at room temperature for about 30 minutes while stirring. After recovery of the benzene, the reaction mixture is filtered to collect white solid, which is washed with water while refluxing and dried to give white polymer (hereinafter referred to as "polymer G") in about 95 percent yield. Softening point, 110° to 120° C. $\eta sp/C=0.11$.

EXAMPLE 8

In an autoclave, polyethylene terephthalate-isophthalate (the molar ratio terephthalic acid and isophthalic acid=9:1; $\eta sp/C=0.750$) (381 parts) and polymer A (19.1 parts) are charged. After substitution of the air with nitrogen, the mixture is blended at 260° C. for 30 minutes in nitrogen stream, taken out from the autoclave and pelletized. The blended polymer is colored extremely slightly, melts at 242° C. and has $\eta sp/C=0.513$. The pellets are dried at 80° C./0.1 mm. Hg for 24 hours, melt-spun at 260° C., drawn four times and thermoset at 180° C. for 5 seconds to give fibers.

EXAMPLE 9

As in example 8, polyethylene terephthalate-isophthalate (the molar ratio of terephthalic acid and isophthalic acid =9:1; $\eta sp/C=0.750$) (382 parts) is blended with polymer B (17.9 parts) to give a blended product having a good tone of color ($\eta sp/C=$), which is spun, drawn and thermoset to give fibers.

EXAMPLE 10

Polyethylene terphthalate-isophthalate $\eta sp/C=0.750$) the molar ratio of terephthalic acid and isophthalic acid=9:1) (373 parts) and polymer D (26.6 parts) are charged in an autoclave, wherein the air is substituted with nitrogen. The mixture is blended well at 265° C. for 20 minutes in nitrogen stream, taken out from the autoclave and pelletized. The blended polymer having a good tone of color melts at 240° C. and has $\eta sp/C=0.560$. The polymer is spun, drawn and thermoset to give fibers.

EXAMPLE 11

Polyethylene terephthalate ($\eta sp/C=0.750$) (377 parts) and polymer C or F (23.2 parts) are charged in an autoclave, wherein the air is substituted with nitrogen. The mixture is blended well at 280° C. for 20 minutes in nitrogen stream, taken out from the autoclave and pelletized. The blended polymer having a good tone of color melts at 240° C. and has $\eta sp/C=0.528$. The polymer is spun at 270° C., drawn and thermoset to give fibers.

EXAMPLE 12

Polyethylene terephthalate ($\eta sp/C=0.750$) (382 parts) dried previously at 165° C./1 mm. Hg for 16 hours and polymer B, E or G (17.9 parts dried previously at room temperature /0.1 mm. Hg for 16 hours are blended well in a short time. The blended polymer is melt-spun at 270° C. with an extruding spinner. The spun filaments are drawn at 70° C. four times and thermoset at 180° C. for 5 seconds.

EXAMPLE 13

Dimethyl terephthalate (9 parts), dimethyl isophthalate (1 part) and ethylene glycol (25 parts) are reacted for transesterification (200° C., 1 hour) and polymerized (275° C.,/0.03 mm. Hg, 2 hours) in a conventional manner in the presence of zinc acetate and germanium dioxide. Just before completion of the polymerization, the reactor is flushed with nitrogen to atmospheric pressure and the temperature is decreased to 265° C. The resultant polymer is combined with polymer C (7 percent for the amount of the resultant polymer) dried previously at room tremperature/0.1 mm. Hg for 16 hours, and the resultant mixture is blended well at the same temperature for 10 minutes and under reduced pressure for 10 minutes. The blended polymer is taken our from the reactor and pelletized. The polymer having a favorable tone of color melts at 239° C. and has $\eta sp/C=0.50$. The polymer is treated as in example 8 to give fibers.

EXAMPLE 14

All the fibers obtained in examples 8 to 13 show the same degree of coloration as wool, and it is confirmed that more than 90 percent of the tertiary amino group for the calculated amount has been introduced stably.

These fibers are dyed under the following dying conditions and found to be fast dyed in more than mediate shade

| Dying conditions | |
|---|---|
| Acidic dye* | 3% OWF |
| Formic acid | 5% OWF |
| Liquid ratio | 1:50 |
| Temperature, period for dying | 120° C., 1 hour |

*) Suminol miling yellow MR

*) Suminol miling brown 3 G

*) Suminol first blue BR conc.

*) Suminol first cyanin green G

*) Suminol levelling brilliant red S3B

*) Suminol levelling violet 3B

Example 15

Dimethyl terephthalate (94 parts), dimethyl isophthalate (6 parts), ethylene glycol (75 parts) and the tertiary amino group-containing glycol as shown in table 1 are charged in a reactor, and the resultant mixture is subjected to the transesterification reaction at 200° C. for 90 minutes in the presence of $Zn(OAc)_2 \cdot 2H_2O$ (0.54 part). The temperature is gradually raised up to 255° C., and the pressure is gradually reduced to 0.03 mm. Hg in about 20 minutes at the same temperature. The polymerization is effected on the conditions for 3 hours. The properties of the polyesters thus obtained are shown in the following table:

TABLE

| Copolymerized component | | Polymer | | | |
|---|---|---|---|---|---|
| Structure | Amount (parts) | Color tone | N, percent | $\eta$ sp/C. | M.P. (° C.) |
| $CH_2N(C_2H_5)_2$<br>$HOCH_2\overset{|}{C}CH_2OH$<br>$\overset{|}{CH_3}$ | 3.9 | Slightly yellow | 0.144 | 0.311 | 257 |
| $CH_2N(C_3H_7)_2$<br>$HOCH_2\overset{|}{C}CH_2OH$<br>$\overset{|}{CH_3}$ | 4.3 | Very slightly yellow | 0.150 | 0.300 | 253 |

TABLE—Continued

| Copolymerized component | | Polymer | | | |
| --- | --- | --- | --- | --- | --- |
| Structure | Amount (parts) | Color tone | N, percent | η sp/C. | M.P. (° C.) |
| $\text{HOCH}_2\underset{\underset{C_2H_5}{\mid}}{\overset{\overset{CH_2N(C_4H_9)_2}{\mid}}{C}}\text{CH}_2\text{OH}$ | 5.0 | ___do___ | 0.174 | 0.301 | 250 |
| $\text{HOCH}_2\underset{\underset{CH_2N(C_3H_7)_2}{\mid}}{\overset{\overset{CH_2N(C_3H_7)_2}{\mid}}{C}}\text{CH}_2\text{OH}$ | 3.2 | ___do___ | 0.121 | 0.352 | 248 |
| $\text{H}{-}(\text{OCH}_2\text{CH}_2)_p{-}\text{OCH}_2\underset{\underset{CH_3}{\mid}}{\overset{\overset{CH_2N(C_4H_9)_2}{\mid}}{C}}\text{CH}_2\text{O}{-}(\text{CH}_2\text{CH}_2\text{O})_q\text{H}$ | 8.5 | Yellow | 0.250 | 0.370 | 245 |

This compound is prepared by reacting the glycol of the formula:

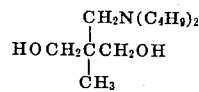

with ethylene oxide in the presence of triethylamine as a catalyst. Of the reaction products, the fraction boiling at 150° to 165° C./0.1 mm. Hg (the average value of $p+q$, 3) is used in this case.

Films of the obtained polyesters are dyeable in a medium shade of color with acidic type dyes.

What is claimed is:

1. A linear polyester essentially consisting of dicarboxylic acid units and glycol units, the whole or part of the glycol units originating in a glycol of the formula:

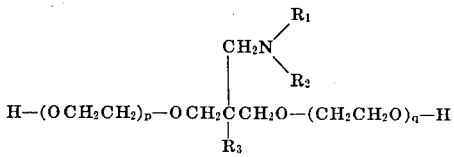

wherein $R_1$ and $R_2$ are each a lower alkyl group or, when taken together, they represent a lower alkylene group, $R_3$ is a lower alkyl group of a group of the formula:

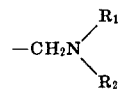

in which $R_1$ and $R_2$ are each as defined above and $p$ and $q$ are each zero or a positive integer not more than 10.

2. A blended polyester comprising a base polyester and the linear polyester according to claim 1 said base polyester being polyethylene terephthalate or a copolymer containing not less than 80 mol% of ethylene terephthalate unit.

* * * * *